US012601329B2

(12) United States Patent
Lo et al.

(10) Patent No.: US 12,601,329 B2
(45) Date of Patent: Apr. 14, 2026

(54) OPTICAL SYSTEM

(71) Applicant: Actutek Corporation, Taoyuan City (TW)

(72) Inventors: Yu-Chiao Lo, Taoyuan City (TW); Chao-Chang Hu, Taoyuan City (TW); Yueh-Lin Lee, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 465 days.

(21) Appl. No.: 18/074,673

(22) Filed: Dec. 5, 2022

(65) Prior Publication Data

US 2023/0179865 A1    Jun. 8, 2023

Related U.S. Application Data

(60) Provisional application No. 63/286,823, filed on Dec. 7, 2021.

(51) Int. Cl.
| | |
|---|---|
| *F03G 7/06* | (2006.01) |
| *H04N 23/54* | (2023.01) |
| *H04N 23/67* | (2023.01) |
| *H04N 23/68* | (2023.01) |

(52) U.S. Cl.
CPC ........... *F03G 7/062* (2021.08); *F03G 7/0614* (2021.08); *H04N 23/54* (2023.01); *H04N 23/67* (2023.01); *H04N 23/6812* (2023.01); *H04N 23/687* (2023.01)

(58) Field of Classification Search
CPC ....... F03G 7/062; F03G 7/0614; H04N 23/54;
H04N 23/67; H04N 23/6812; H04N 23/687; H04N 23/55; G02B 7/08; G02B 27/646; G02B 7/00; G02B 7/04; G03B 5/02; G03B 2205/0015; G03B 2205/0069; G03B 3/10; G03B 30/00; H02K 33/02; H02K 33/18
See application file for complete search history.

(56) References Cited

U.S. PATENT DOCUMENTS

2020/0249421 A1*    8/2020    Hu ..................... H04N 23/6812

FOREIGN PATENT DOCUMENTS

| JP | 2013101279 A | * | 5/2013 | |
|---|---|---|---|---|
| KR | 20100028886 A | * | 3/2010 | ............. H05K 13/04 |

OTHER PUBLICATIONS

KR 20100028886 Translation (Year: 2010).*
JP 2013101279 Translation (Year: 2013).*

* cited by examiner

*Primary Examiner* — Sinh Tran
*Assistant Examiner* — Angel L Garces-Rivera
(74) *Attorney, Agent, or Firm* — MUNCY, GEISSLER, OLDS & LOWE, P.C.

(57) ABSTRACT

An optical system is provided. The optical system includes a first moveable unit, an optical module, an affixed base and a first driving module. The optical module includes an optical axis, wherein the optical module is connected to the first moveable unit. The first moveable unit is adapted to be moved relative to the affixed base. The first driving module is adapted to drive the first moveable unit to move relative to the affixed base.

19 Claims, 14 Drawing Sheets

S1

S1

S1

S1

S2

S3

OPTICAL SYSTEM

CROSS REFERENCE TO RELATED APPLICATIONS

This application claims the benefit of U.S. Provisional Application No. 63/286,823, filed Dec. 7, 2021, the entirety of which is incorporated by reference herein.

BACKGROUND OF THE INVENTION

Field of the Invention

The present invention relates to an optical system, and in particular to an optical system can be driven multi-directionally.

Description of the Related Art

Technology has developed in such a way that many electronic devices (such as smartphones or digital cameras) have the function of taking photos and recording videos. These electronic devices are in common use, and they are designed to be more convenient and thinner with each generation, to provide more choices for the user.

Some electronic devices equipped with cameras or video-recording functionality are provided with a lens driving module to drive an optical element to move, thereby performing autofocus (AF) and optical image stabilization (OIS) functions. Light can pass through the optical element and form an image on a photosensitive element.

It is difficult to save space when the optical system of a voice coil actuator (VCM) is combined with a stage. Since the autofocus unit and the optical image stabilization unit have their own functions and structures, integration is difficult.

BRIEF SUMMARY OF THE INVENTION

Embodiments of the invention are provided to address the aforementioned difficulty.

In one embodiment, an optical system is provided. The optical system includes a first moveable unit, an optical module, an affixed base and a first driving module. The optical module includes an optical axis, wherein the optical module is connected to the first moveable unit. The first moveable unit is adapted to be moved relative to the affixed base. The first driving module is adapted to drive the first moveable unit to move relative to the affixed base.

In one embodiment, the optical system further includes a first inertia sensor and a control unit. The first inertia sensor detects the movement of the optical module, and the optical axis passes through the first inertia sensor. The control unit is coupled to the first inertia sensor, wherein the control unit controls the first driving module according to the first sensing signal generated by the first inertia sensor.

In one embodiment, the optical system further comprises an image sensor, a second driving module and a second inertia sensor, wherein the image sensor corresponds to the optical module, the second driving module is adapted to move the image sensor relative to the first moveable unit, the second inertia sensor is adapted to detect the movement of the image sensor relative to the first moveable unit, the control unit is coupled to the second inertia sensor, and the control unit controls the second driving module according to the second sensing signal generated by the second inertia sensor.

In one embodiment, the optical system further comprises a circuit module adapted to be connected to an outer circuit. The circuit module comprises a first circuit element, a second circuit element and a third circuit element. The first circuit element is electrically connected to the first inertia sensor. The second circuit element is electrically connected to the second driving module. The third circuit element is electrically connected to the image sensor, wherein the first circuit element, the second circuit element and the third circuit element overlap, and the third circuit element is located between the first circuit element and the second circuit element.

In one embodiment, the optical system further comprises a first elastic element, wherein the first inertia sensor is moveably connected to the first circuit element via the first elastic element.

In one embodiment, the second inertia sensor is disposed on the second circuit element.

In one embodiment, the first driving module is adapted to drive the first moveable unit to rotate the first moveable unit around a first axis and a second axis relative to the affixed base, and the first axis is perpendicular to the second axis.

In one embodiment, the second driving module is adapted to drive the image sensor to move the image sensor along the first axis and the second axis relative to the first moveable unit.

In one embodiment, the optical system further comprises a second moveable unit and a third driving module, wherein the optical module is connected to the second moveable unit, and the third driving module is adapted to move the second moveable unit and the optical module relative to the first moveable unit.

In one embodiment, the first driving module comprises a first coil, the second driving module comprises a second coil, the first moveable unit comprises a magnetic unit, the magnetic unit further comprises a first magnetic element and the second magnetic element, a magnetic pole alignment direction of the first magnetic element is not parallel to a magnetic pole alignment direction of the second magnetic element, the first coil corresponds to the second magnetic element, and the second coil corresponds to the first magnetic element and the second magnetic element simultaneously.

In one embodiment, the third driving module comprises a third coil, the third coil is disposed on the second moveable unit, and the third coil corresponds to the first magnetic element.

In one embodiment, the magnetic unit is located between the first coil and the third coil.

In one embodiment, the first magnetic element comprises a first pole and a second pole, the second magnetic element comprises a third pole and a fourth pole, the second pole is adjacent to the second magnetic element, the first pole is opposite to the second pole, the fourth pole faces the second coil, the third pole is opposite to the fourth pole, and the magnetic polarity of the first pole differs from the magnetic polarity of the fourth pole.

In one embodiment, in the magnetic pole alignment direction of the first magnetic element, the width of the first magnetic element differs from the width of the second magnetic element.

In one embodiment, in the magnetic pole alignment direction of the first magnetic element, the width of the first magnetic element is smaller than the width of the second magnetic element.

In one embodiment, the magnetic unit is adapted to be driven by the first coil, the second coil and the third coil.

In one embodiment, the optical system further comprises a third inertia sensor and a third magnetic element, wherein the third inertia sensor is disposed on the second moveable unit, the third magnetic element is disposed on the first moveable unit, the third inertia sensor corresponds to the third magnetic element, the control unit is coupled to the third inertia sensor, and the control unit controls the third driving module according to a third sensing signal generated by the third inertia sensor.

In one embodiment, the optical system further comprises a suspension structure, wherein the third driving module is coupled to the suspension structure, and the suspension structure is coupled to the second circuit element.

In one embodiment, the affixed base comprises an outlet side, the circuit module is connected to the outer circuit via the outlet side, and the first driving module and the second driving module are not disposed on the outlet side.

In one embodiment, the optical system further comprises a first inertia sensor, an image sensor, a second driving module, a second inertia sensor and a control unit. The first inertia sensor detects the movement of the optical module. The image sensor is corresponding to the optical module. The second driving module is adapted to move the image sensor relative to the first moveable unit. The second inertia sensor is adapted to detect the movement of the image sensor relative to the first moveable unit. The control unit is coupled to the first inertia sensor and the second inertia sensor, wherein the control unit controls the first driving module according to the first sensing signal generated by the first inertia sensor, and the control unit controls the second driving module according to the second sensing signal generated by the second inertia sensor.

In one embodiment, the optical system further comprises a circuit module adapted to be connected to an outer circuit. The circuit module comprises a first circuit element, a second circuit element and a third circuit element. The first inertia sensor is disposed on the first circuit element. The second driving module and the second inertia sensor are disposed on the second circuit element. The image sensor is disposed on the third circuit element, wherein the first circuit element, the second circuit element and the third circuit element overlap.

In one embodiment, the optical system further comprises a circuit module adapted to be connected to an outer circuit. The circuit module comprises a second circuit element and a third circuit element. The second driving module and the second inertia sensor are disposed on the second circuit element, and the first inertia sensor is electrically connected to the second circuit element. The image sensor is disposed on the third circuit element, wherein the second circuit element and the third circuit element overlap.

In one embodiment of the invention, the magnetic unit can be driven by the first driving module (stage), the second driving module (OIS) and the third driving module (AF). Compared to the conventional art, the number of the magnetic elements is decreased, and the size of the magnetic element is narrowed. The space inside the optical system is sufficiently utilized, and the size of the optical system can be reduced.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
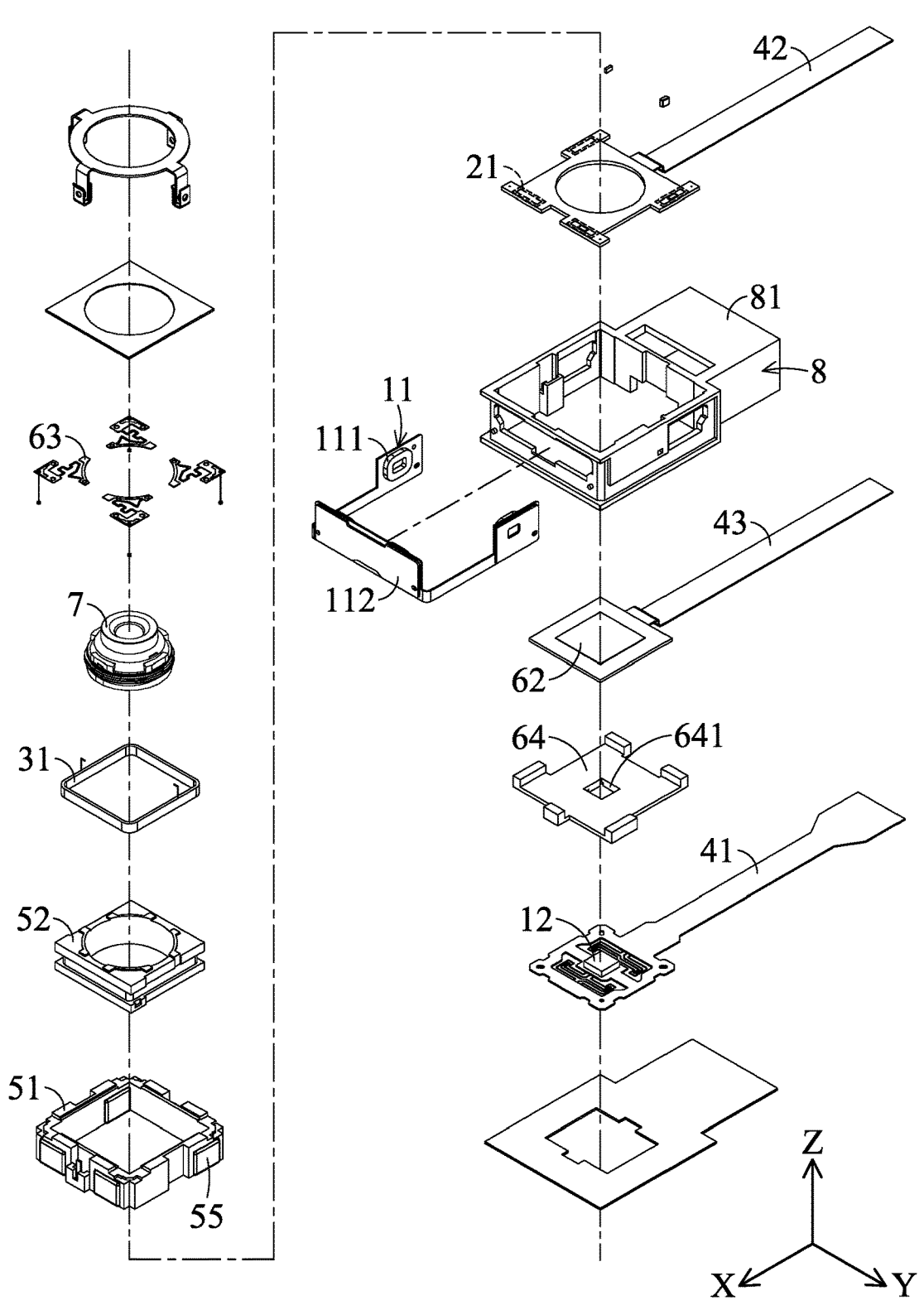
FIG. 1 is an exploded view of an optical system of a first embodiment of the invention.
Figure 2A:
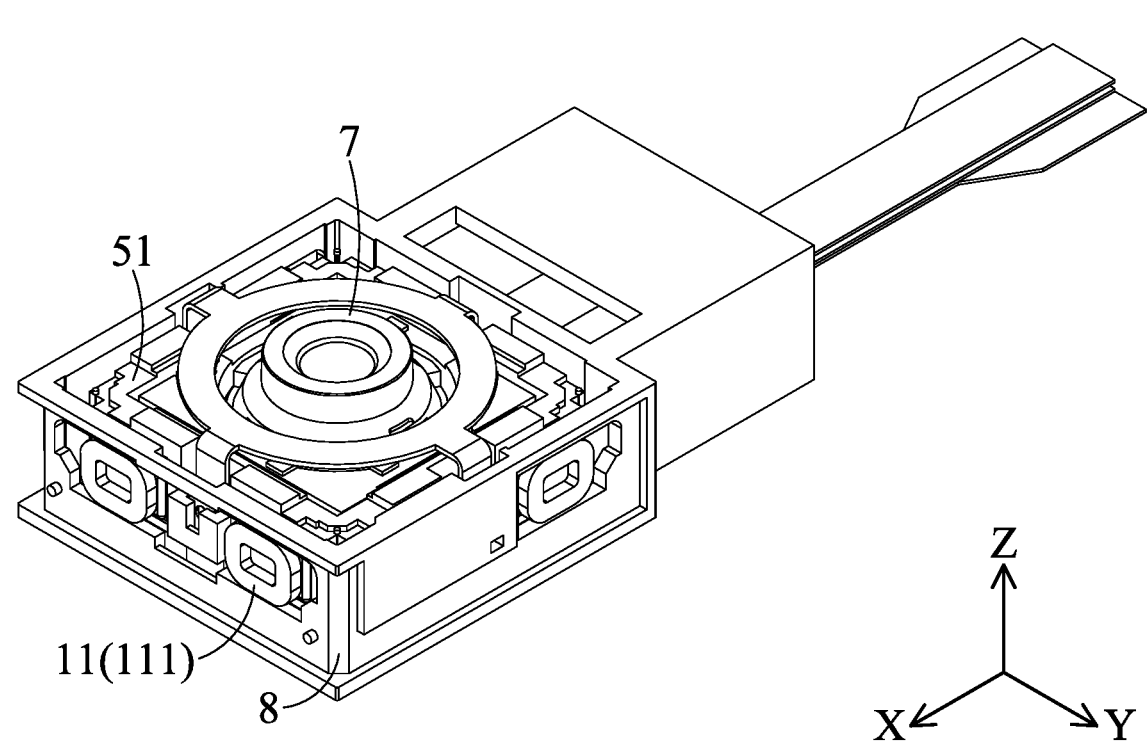
FIG. 2A is an assembled view of the optical system of the first embodiment of the invention.
Figure 2B:
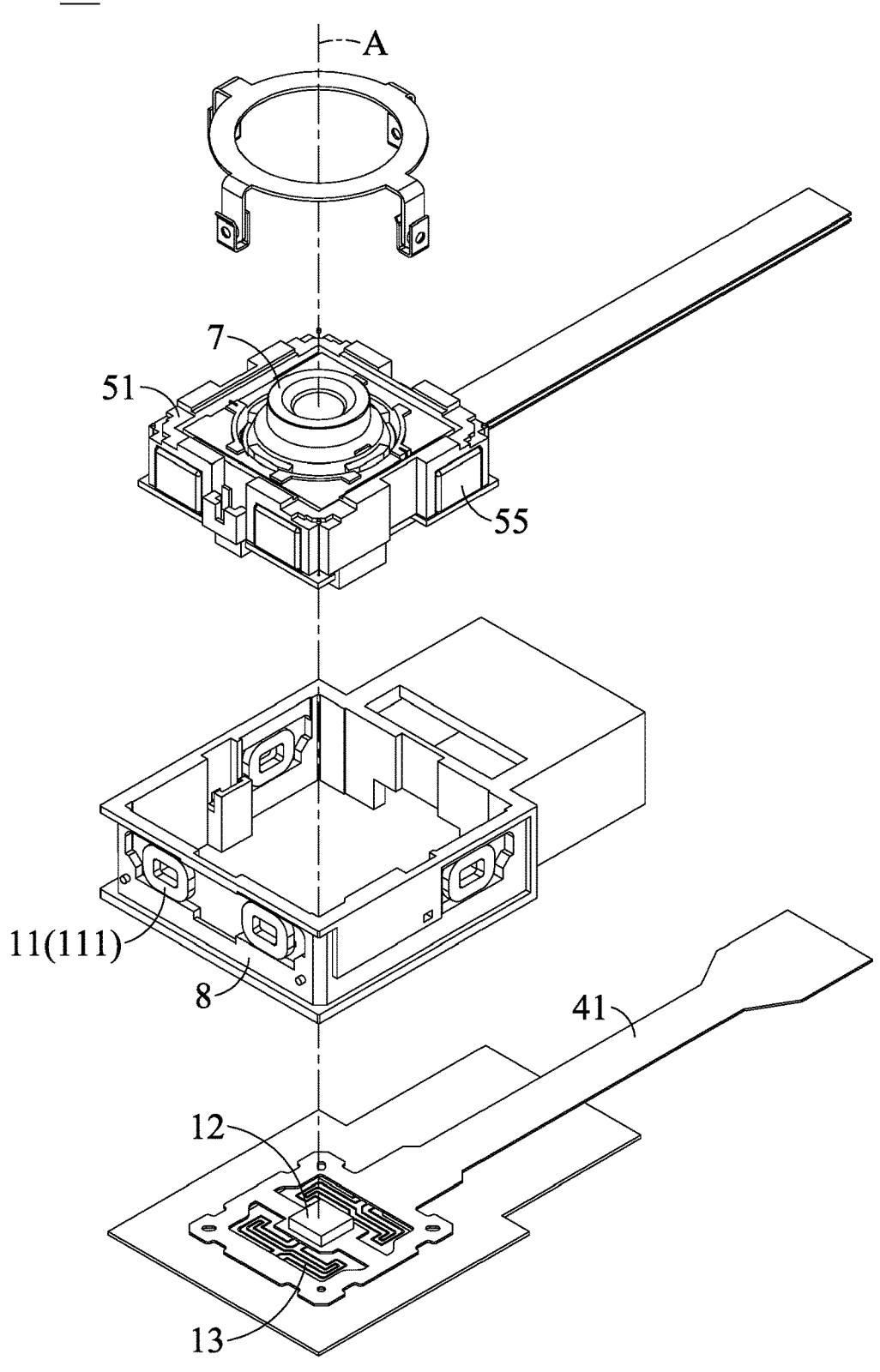
FIG. 2B shows the details of the first moveable unit and the first driving module of the first embodiment of the invention.

FIG. 1 is an exploded view of an optical system of a first embodiment of the invention. FIG. 2A is an assembled view of the optical system of the first embodiment of the invention. FIG. 2B shows the details of the first moveable unit and the first driving module of the first embodiment of the invention. With reference to FIGS. 1, 2A and 2B, the optical system S1 of the first embodiment of the invention includes a first moveable unit 51, an optical module 7, an affixed base 8 and a first driving module (for example, a stage driving module) 11. The optical module 7 includes an optical axis A, wherein the optical module 7 is connected to the first moveable unit 51. The first moveable unit 51 is adapted to be moved relative to the affixed base 8. The first driving module 11 is adapted to drive the first moveable unit 51 to move the first movable unit 51 relative to the affixed base 8. In this embodiment, the first driving module 11 is adapted to drive the first moveable unit 51 to rotate the first moveable unit 51 around a first axis (X axis) and a second axis (Y axis) relative to the affixed base 8, and the first axis (X axis) is perpendicular to the second axis (Y axis).

Figure 3:
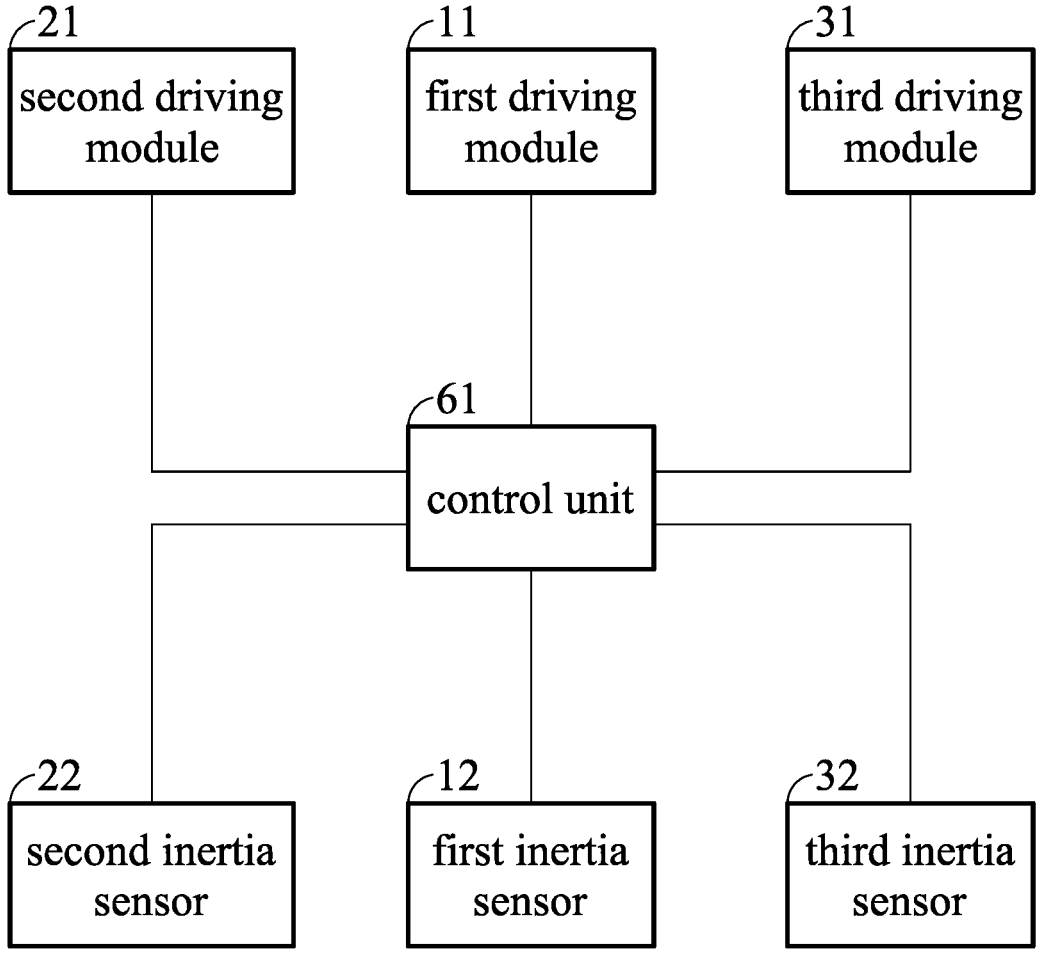
FIG. 3 shows a control unit of the embodiment of the invention.

FIG. 3 shows a control unit of the embodiment of the invention. With reference to FIGS. 1, 2B and 3, in one embodiment, the optical system S1 further includes a first inertia sensor 12 and a control unit 61. The first inertia sensor 12 detects the movement of the optical module 7. The optical axis A passes through the first inertia sensor 12. The control unit 61 is coupled to the first inertia sensor 12. The control unit 61 controls the first driving module 11 according to the first sensing signal generated by the first inertia sensor 12.

Figure 4A:
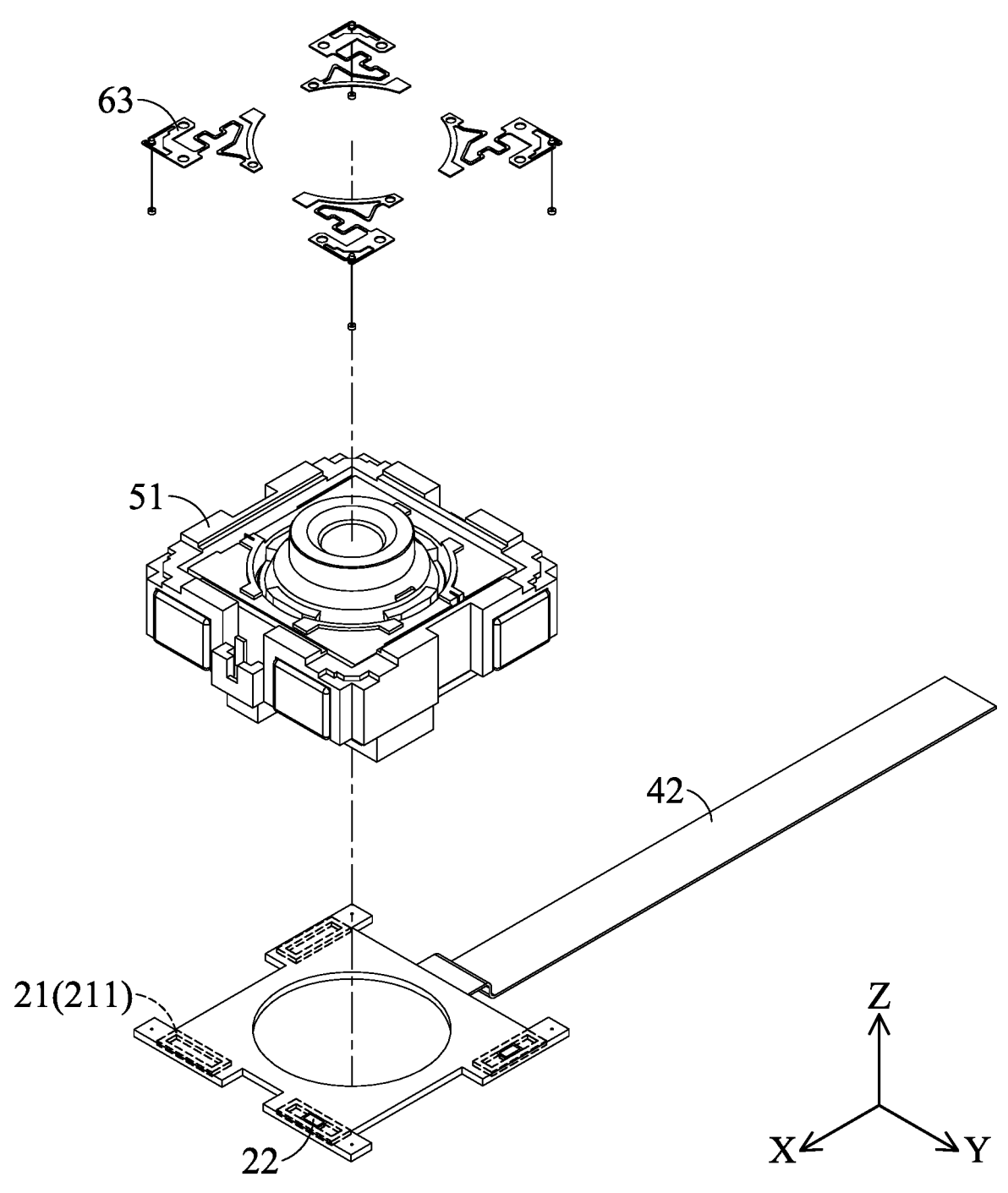
FIG. 4A shows the details of a second driving module and a second inertia sensor of the first embodiment of the invention.
Figure 4B:
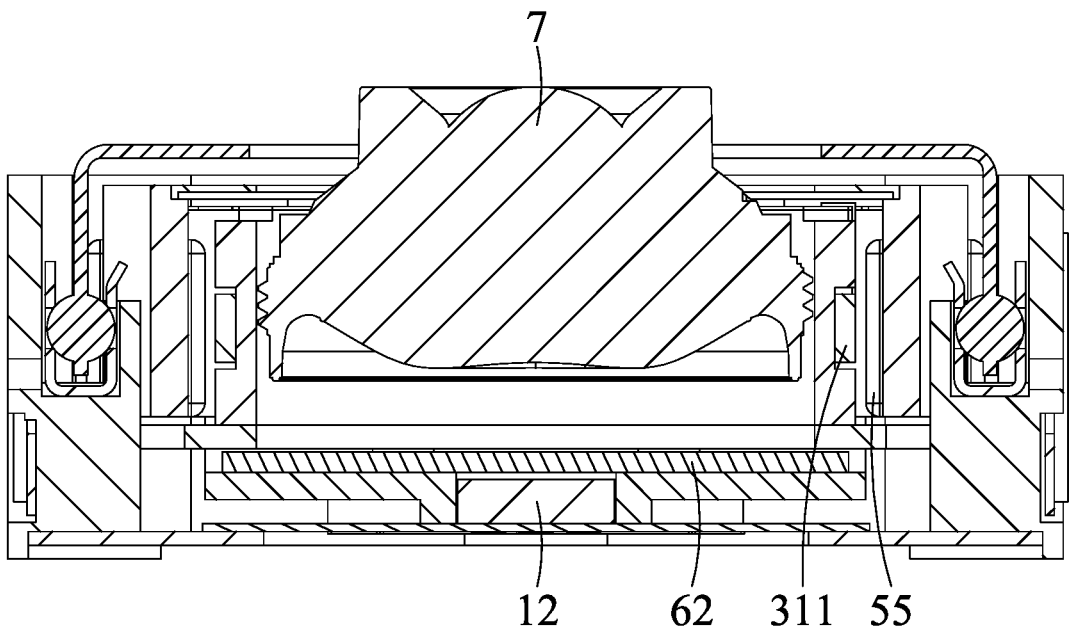
FIG. 4B is a cross sectional view of the optical system of the first embodiment of the invention.

FIG. 4A shows the details of a second driving module and a second inertia sensor of the first embodiment of the invention. FIG. 4B is a cross sectional view of the optical system of the first embodiment of the invention. With reference to FIGS. 1, 4A and 4B, in one embodiment, the optical system further comprises an image sensor 62, a second driving module (for example, an OIS driving module) and a second inertia sensor 22. The image sensor 62 corresponds to the optical module 7. The second driving module 21 is adapted to move the image sensor 62 relative to the first moveable unit 51. The second inertia sensor 22 is adapted to detect the movement of the image sensor 62 relative to the first moveable unit 51. The control unit 61 is coupled to the second inertia sensor 22, and the control unit 61 controls the second driving module 21 according to the second sensing signal generated by the second inertia sensor 22. In this embodiment, the second driving module 21 is adapted to drive the image sensor 62 to move the image sensor 62 along the first axis (X axis) and the second axis (Y axis) relative to the first moveable unit 51. In one embodiment, the first inertia sensor 12 is disposed bellow the image sensor 62. A carrier 64 is disposed bellow the image sensor 62. The carrier 64 has an opening 641. The opening 641 corresponds to the first inertia sensor 12.

Figure 5:
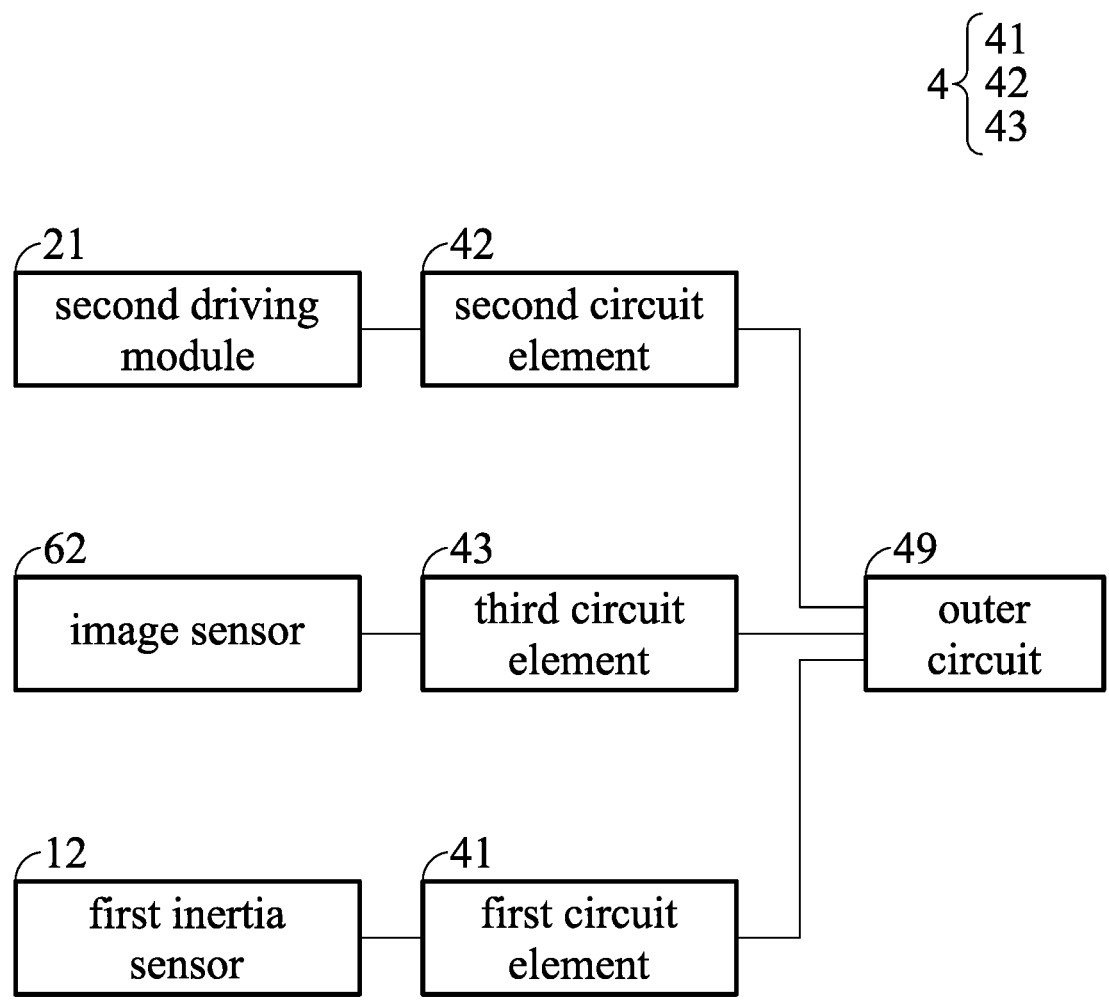
FIG. 5 shows a circuit module of the first embodiment of the invention.

FIG. 5 shows a circuit module of the first embodiment of the invention. With reference to FIGS. 1 and 5, in one embodiment, the optical system further comprises a circuit module 4 adapted to be connected to an outer circuit 49. The circuit module 4 comprises a first circuit element 41, a second circuit element 42 and a third circuit element 43. The first circuit element 41 is electrically connected to the first inertia sensor 12. The second circuit element 42 is electrically connected to the second driving module 21. The third circuit element 43 is electrically connected to the image sensor 62. The first circuit element 41, the second circuit element 42 and the third circuit element 43 overlap. With reference to FIG. 1, particularly, the third circuit element 43 is located between the first circuit element 41 and the second circuit element 42.

With reference to FIG. 2B, in one embodiment, the optical system further comprises a first elastic element 13. The first inertia sensor 12 is moveably connected to the first circuit element 41 via the first elastic element 13. In one embodiment, the first elastic element 13 includes an elastic sheet.

With reference to FIG. 4A, in one embodiment, the second inertia sensor 22 is disposed on the second circuit element 42.

Figure 6:
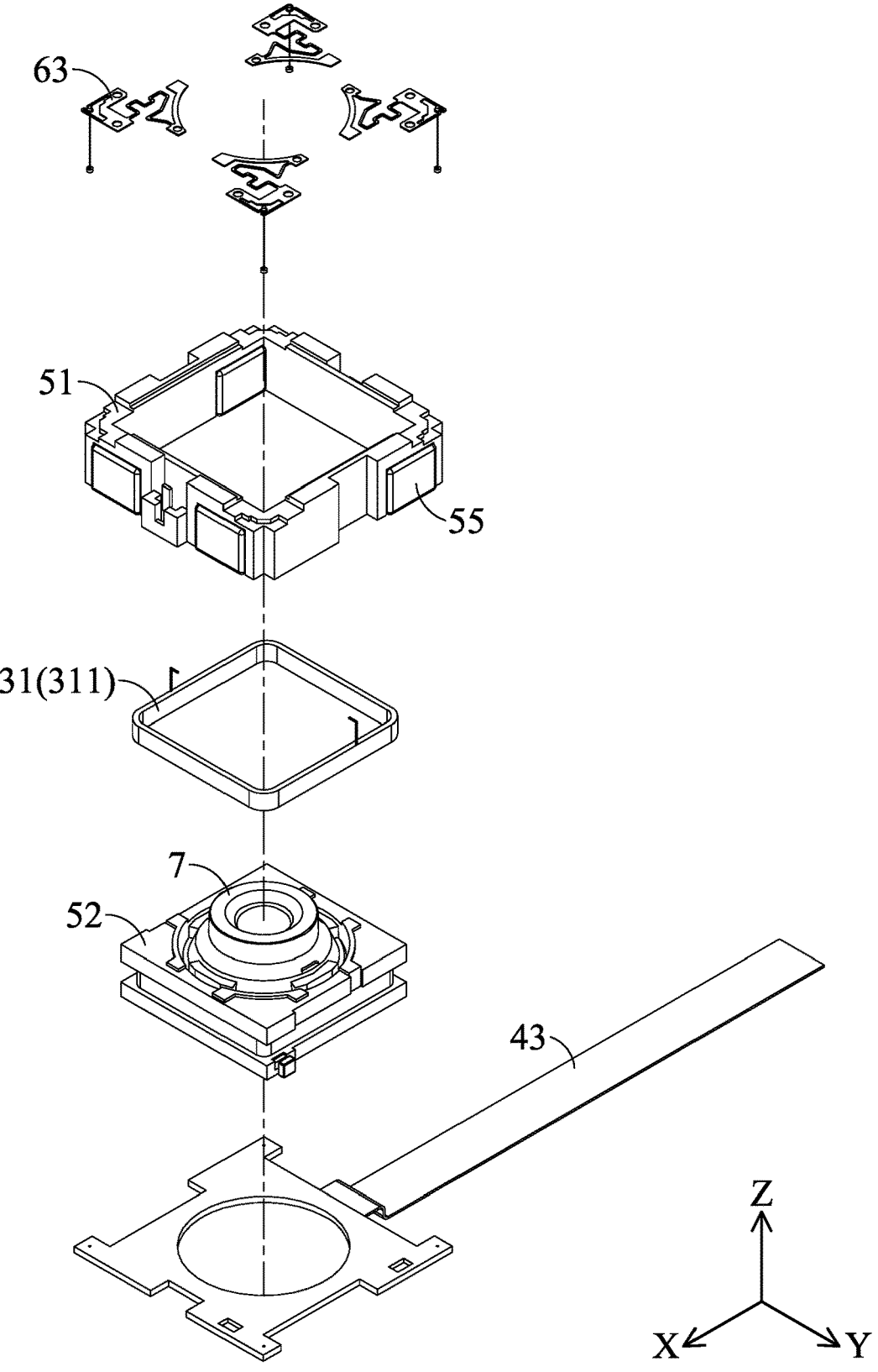
FIG. 6 shows the details of a second moveable unit and a third driving module of the embodiment of the invention.

FIG. 6 shows the details of a second moveable unit and a third driving module of the embodiment of the invention. With reference to FIGS. 1 and 6, in one embodiment, the optical system further comprises a second moveable unit 52 and a third driving module (for example, an AF driving module) 31. The optical module 7 is connected to the second moveable unit 52, and the third driving module 31 is adapted to move the second moveable unit 52 and the optical module 7 relative to the first moveable unit 51.

Figure 7:
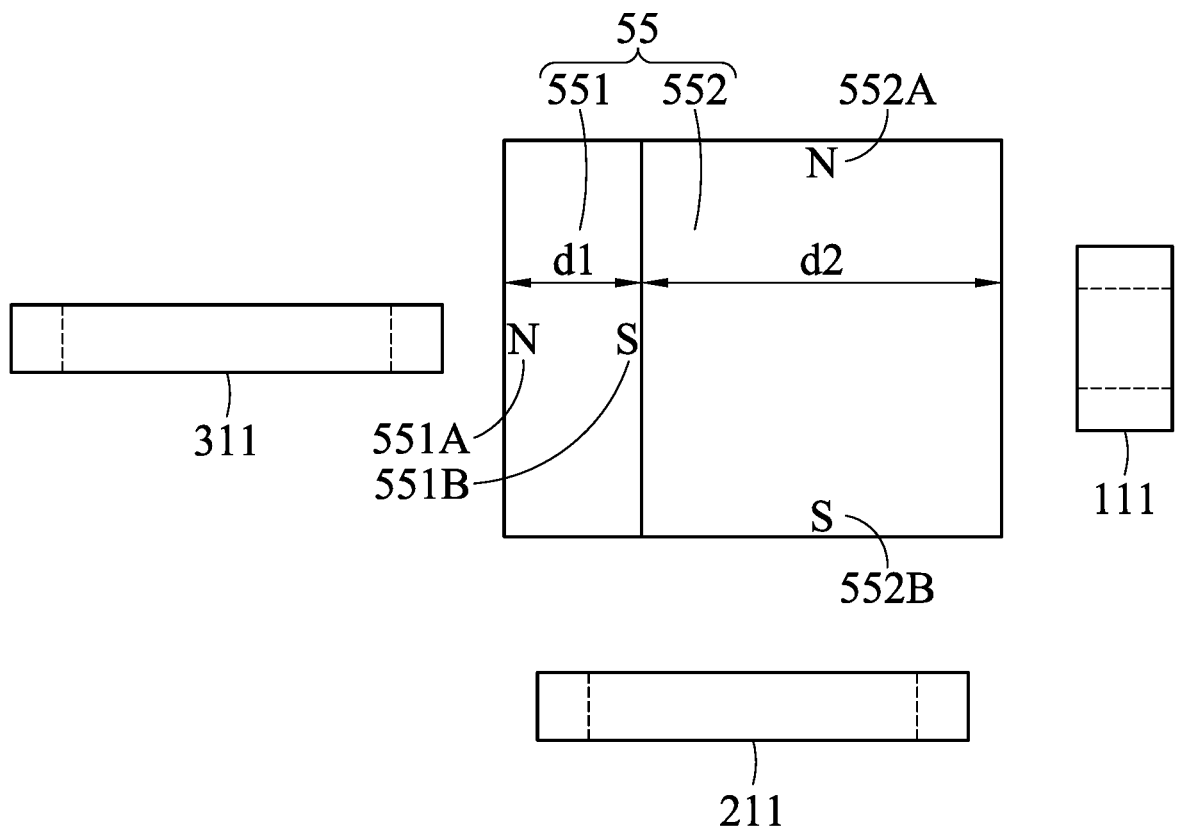
FIG. 7 shows the details of a magnetic unit of the embodiment of the invention.

FIG. 7 shows the details of a magnetic unit of the embodiment of the invention. With reference to FIGS. 1, 2A, 2B, 4A and 7, in one embodiment, the first driving module 11 comprises a plurality of first coils 111 and a flexible circuit board 112. The second driving module 21 comprises a plurality of second coils 211. The first moveable unit 51 comprises a magnetic unit 55. The magnetic unit 55 further comprises a first magnetic element 551 and the second magnetic element 552. A magnetic pole alignment direction of the first magnetic element 551 is not parallel to a magnetic pole alignment direction of the second magnetic element 552. The first coil 111 corresponds to the second magnetic element 552. The second coil 211 corresponds to the first magnetic element 551 and the second magnetic element 552 simultaneously.

In one embodiment, the magnetic unit 55 is disposed on a lateral side of the first moveable unit 51. The first driving module 11 is disposed on a lateral side of the affixed base 8. The first coil 111 corresponds to the magnetic unit 55.

In one embodiment, the first driving module 11 (including the first coil 111 and the flexible circuit board 112) is adapted to be electrically connected to the first circuit element 41. The disclosure is not meant to restrict the invention. For example, in another embodiment, the first driving module 11 (including the first coil 111 and the flexible circuit board 112) can be electrically connected to the second circuit element 42 of the third circuit element 43.

With reference to FIGS. 4B, 6 and 7, in one embodiment, the third driving module 31 comprises a third coil 311. The third coil 311 is disposed on the second moveable unit 52. The third coil 311 corresponds to the first magnetic element 551. In one embodiment, the magnetic unit 55 is located between the first coil 111 and the third coil 311.

With reference to FIG. 7, in one embodiment, the first magnetic element 551 comprises a first pole 551A and a second pole 551B. The second magnetic element 552 comprises a third pole 552A and a fourth pole 552B. The second pole 551B is adjacent to the second magnetic element 552. The first pole 551A is opposite to the second pole 551B. The fourth pole 552B faces the second coil 211. The third pole 552A is opposite to the fourth pole 552B. The magnetic polarity of the first pole 551A differs from the magnetic polarity of the fourth pole 552B.

With reference to FIG. 7, in one embodiment, in the magnetic pole alignment direction of the first magnetic element, the width d1 of the first magnetic element 551 differs from the width d2 of the second magnetic element 552. Therefore, the magnetic unit 551 provides a uniform magnetic field and better driving stability.

With reference to FIG. 7, in one embodiment, in the magnetic pole alignment direction of the first magnetic element 551, the width d1 of the first magnetic element 662 is smaller than the width d2 of the second magnetic element 552.

Figure 8:
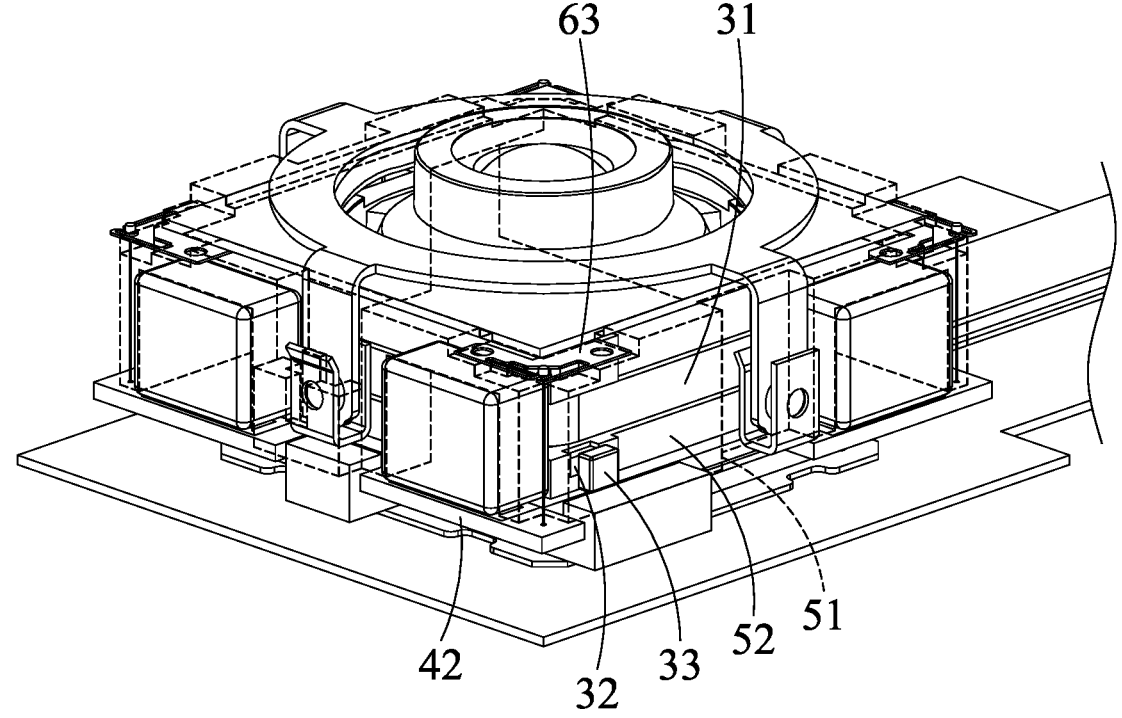
FIG. 8 shows the details of a third inertia sensor of the embodiment of the invention.

FIG. 8 shows the details of a third inertia sensor of the embodiment of the invention. With reference to FIGS. 3 and 8, in one embodiment, the optical system further comprises a third inertia sensor 32 and a third magnetic element 33. The third inertia sensor 32 is disposed on the second moveable unit 52. The third magnetic element 33 is disposed on the first moveable unit 51. The third inertia sensor 32 corresponds to the third magnetic element 33. The control unit 61 is coupled to the third inertia sensor 32. The control unit 61 controls the third driving module 31 according to a third sensing signal generated by the third inertia sensor 32.

With reference to FIG. 8, in one embodiment, the optical system further comprises a suspension structure 63. The coil 311 of the third driving module 31 is coupled to the suspension structure 63. The suspension structure 63 is coupled to the second circuit element 42.

With reference to FIGS. 1 and 5, in one embodiment, the affixed base 8 comprises an outlet side 81. The circuit module 4 is connected to the outer circuit 49 via the outlet side 81. The first driving module 11 and the second driving module 21 are not disposed on the outlet side.

In another embodiment, the optical system can be disposed in an electronic device. The electronic device includes a device housing. The affixed base is affixed to the device housing. The disclosure is not meant to restrict the invention.

In the first embodiment, the first inertia sensor 12 can be a Gyro sensor. The second inertia sensor 22 can be a Hall sensor. The third inertia sensor 32 can be a Hall sensor. The disclosure is not meant to restrict the invention.

Figure 9A:
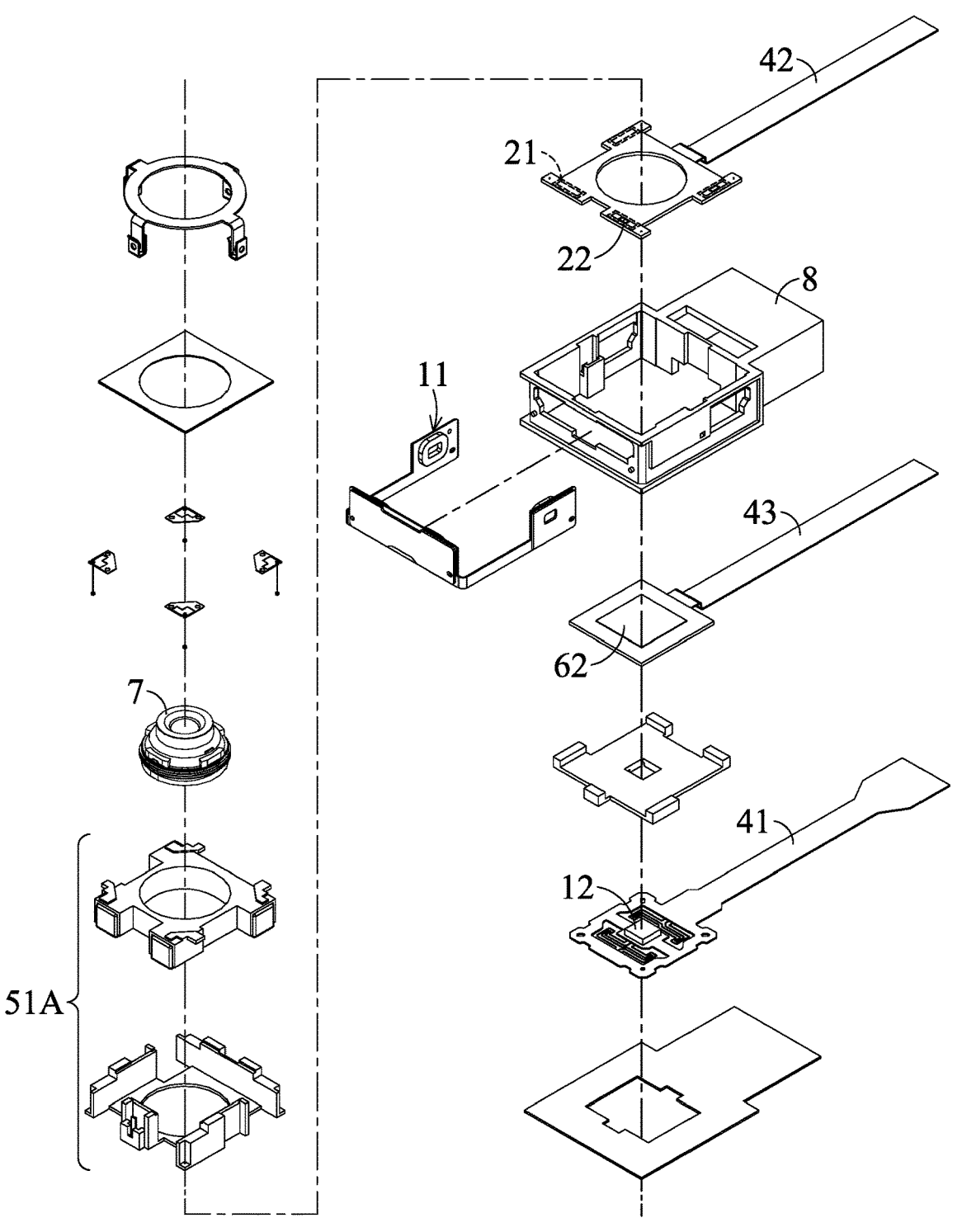
FIG. 9A is an exploded view of an optical system of a second embodiment of the invention.
Figure 9B:
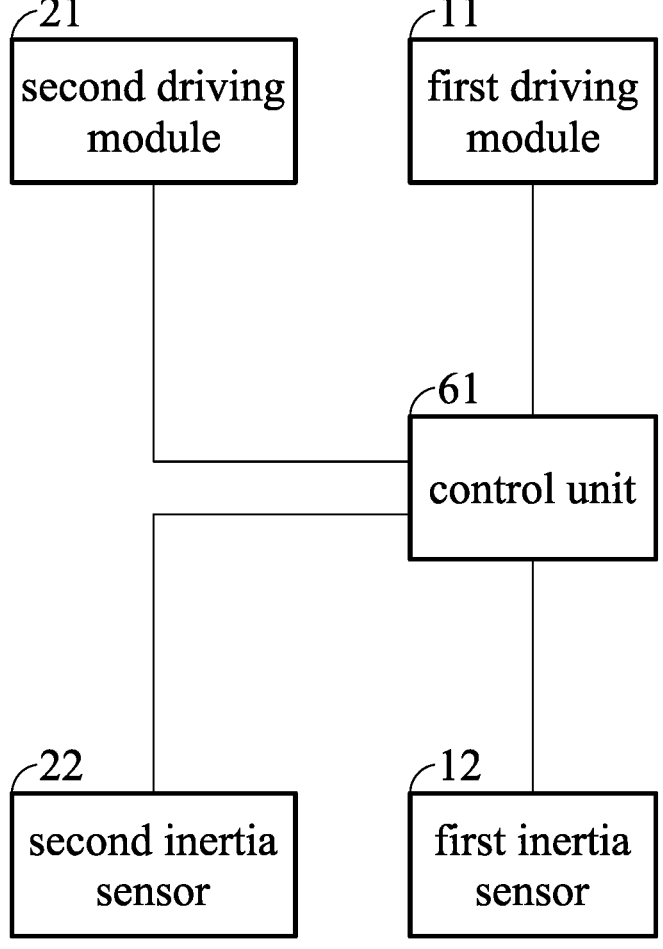
FIG. 9B is a block diagram of the optical system of the second embodiment of the invention.

FIG. 9A is an exploded view of an optical system of a second embodiment of the invention. FIG. 9B is a block diagram of the optical system of the second embodiment of the invention. With reference to FIGS. 9A and 9B, in this embodiment, the optical system S2 comprises a first moveable unit 51A, an optical module 7, an affixed base 8, a first driving module 11, a first inertia sensor 12, an image sensor 62, a second driving module 21, a second inertia sensor 22 and a control unit 61. The first inertia sensor 12 detects the movement of the optical module 7. The image sensor 62 is corresponding to the optical module 7. The second driving module 21 is adapted to move the image sensor 62 relative to the first moveable unit 51A. The second inertia sensor 22 is adapted to detect the movement of the image sensor 62 relative to the first moveable unit 51A. The control unit 61 is coupled to the first inertia sensor 12 and the second inertia sensor 22. The control unit 61 controls the first driving module 11 according to the first sensing signal generated by the first inertia sensor 12, and the control unit 61 controls the second driving module 21 according to the second sensing signal generated by the second inertia sensor 22.

With reference to FIG. 9A, in this embodiment, the circuit module comprises a first circuit element 41, a second circuit element 42 and a third circuit element 43. The first inertia sensor 12 is disposed on the first circuit element 41. The second driving module 21 and the second inertia sensor 22 are disposed on the second circuit element 42. The image sensor 62 is disposed on the third circuit element 43. The first circuit element 41, the second circuit element 42 and the third circuit element 43 overlap.

In the second embodiment, the first inertia sensor 12 can be a Gyro sensor. The second inertia sensor 22 can be a Hall sensor. The disclosure is not meant to restrict the invention.

Figure 10A:
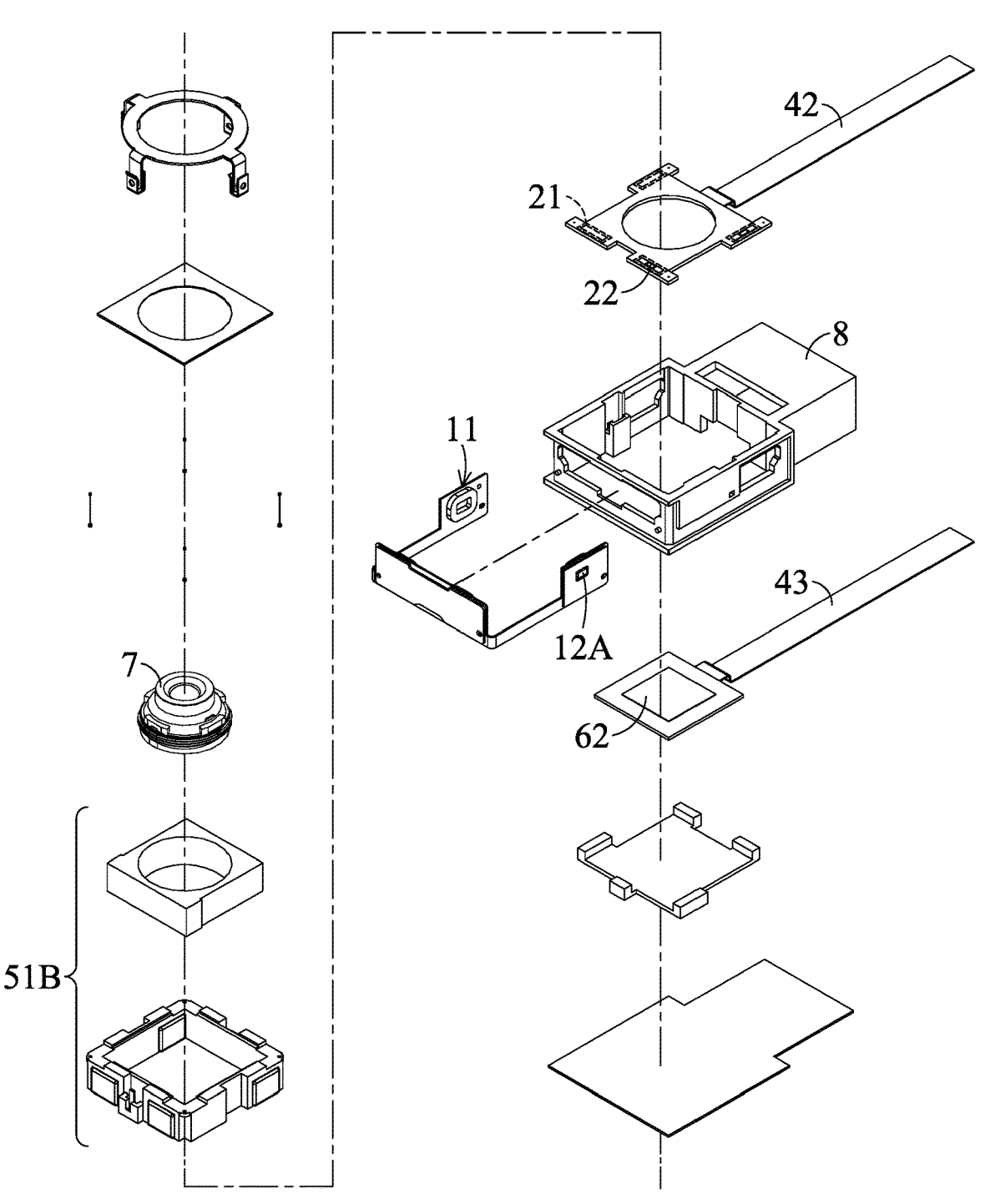
FIG. 10A is an exploded view of an optical system of a third embodiment of the invention.
Figure 10B:
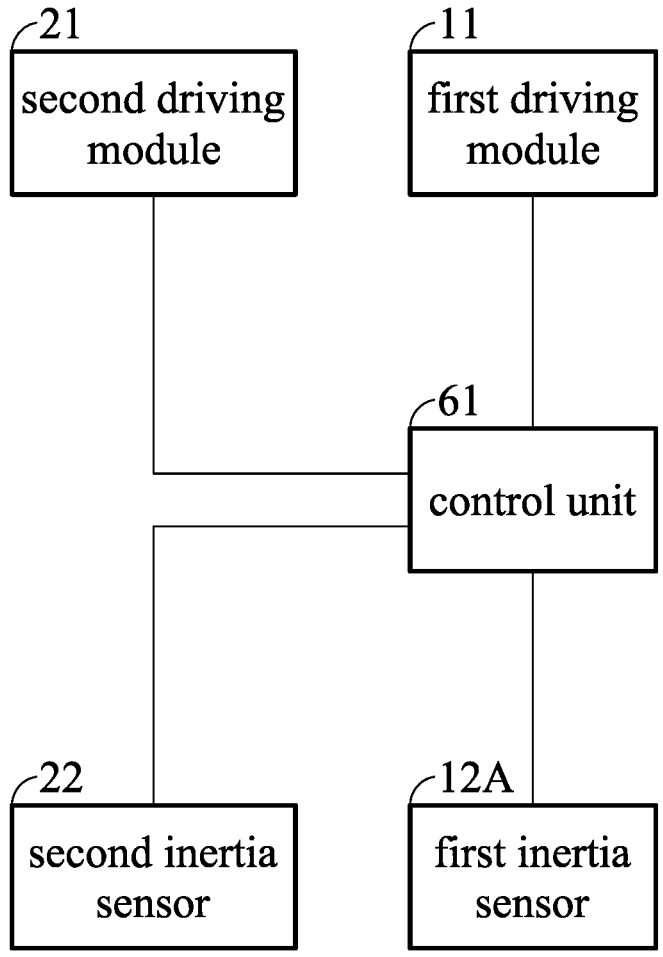
FIG. 10B is a block diagram of the optical system of the third embodiment of the invention.

FIG. 10A is an exploded view of an optical system of a third embodiment of the invention. FIG. 10B is a block diagram of the optical system of the third embodiment of the invention. With reference to FIGS. 10A and 10B, in this embodiment, the optical system S3 comprises a first moveable unit 51B, an optical module 7, an affixed base 8, a first driving module 11, a first inertia sensor 12A, an image sensor 62, a second driving module 21, a second inertia sensor 22 and a control unit 61. The first inertia sensor 12A detects the movement of the optical module 7. The image sensor 62 is corresponding to the optical module 7. The second driving module 21 is adapted to move the image sensor 62 relative to the first moveable unit 51B. The second inertia sensor 22 is adapted to detect the movement of the image sensor 62 relative to the first moveable unit 51B. The control unit 61 is coupled to the first inertia sensor 12A and the second inertia sensor 22. The control unit 61 controls the first driving module 11 according to the first sensing signal generated by the first inertia sensor 12A, and the control unit 61 controls the second driving module 21 according to the second sensing signal generated by the second inertia sensor 22.

With reference to FIG. 10A, in one embodiment, the circuit module comprises a second circuit element 42 and a third circuit element 43. The second driving module 21 and the second inertia sensor 22 are disposed on the second circuit element 42. The first inertia sensor 12A is electrically connected to the second circuit element 42. The image sensor 62 is disposed on the third circuit element 43. The second circuit element 42 and the third circuit element 43 overlap.

In the third embodiment, the first inertia sensor 12A can be a Hall sensor. The second inertia sensor 22 can be a Hall sensor. The disclosure is not meant to restrict the invention.

In one embodiment of the invention, the magnetic unit can be driven by the first driving module (stage), the second driving module (OIS) and the third driving module (AF). Compared to the conventional art, the number of the magnetic elements is decreased, and the size of the magnetic element is narrowed. The space inside the optical system is sufficiently utilized, and the size of the optical system can be reduced.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical system is provided, comprising:

a first moveable unit;

an optical module, comprising an optical axis, wherein the optical module is connected to the first moveable unit;

an affixed base, wherein the first moveable unit is adapted to be moved relative to the affixed base;

a first driving module, adapted to drive the first moveable unit to move relative to the affixed base;

a first inertia sensor, wherein the first inertia sensor detects the movement of the optical module, and the optical axis passes through the first inertia sensor;

a control unit, coupled to the first inertia sensor, wherein the control unit controls the first driving module according to a first sensing signal generated by the first inertia sensor;

an image sensor;

a second driving module, wherein the image sensor corresponds to the optical module, the second driving module is adapted to move the image sensor relative to the first moveable unit; and a circuit module, adapted to be connected to an outer circuit, wherein the circuit module comprises:

a first circuit element, electrically connected to the first inertia sensor;

a second circuit element, electrically connected to the second driving module; and a third circuit element, electrically connected to the image sensor, wherein the first circuit element, the second circuit element and the third circuit element overlap along the optical axis, and the third circuit element is located between the first circuit element and the second circuit element.

2. The optical system as claimed in claim 1, further comprising a second inertia sensor, wherein the second inertia sensor is adapted to detect the movement of the image sensor relative to the first moveable unit, the control unit is coupled to the second inertia sensor, and the control unit controls the second driving module according to a second sensing signal generated by the second inertia sensor.

3. The optical system as claimed in claim 2, further comprising a second moveable unit, a third driving module and a suspension structure, wherein the optical module is connected to the second moveable unit, and the third driving module is adapted to move the second moveable unit and the optical module relative to the first moveable unit, the third driving module is coupled to the suspension structure, and the suspension structure is coupled to the second circuit element.

4. The optical system as claimed in claim 2, wherein the affixed base comprises an outlet side, the circuit module is connected to the outer circuit via the outlet side, and the first driving module and the second driving module are not disposed on the outlet side.

5. The optical system as claimed in claim 2, further comprising a first elastic element, wherein the first inertia sensor is moveably connected to the first circuit element via the first elastic element.

6. The optical system as claimed in claim 5, wherein the second inertia sensor is disposed on the second circuit element.

7. The optical system as claimed in claim 2, wherein the first driving module is adapted to drive the first moveable unit and to rotate the first moveable unit around a first axis and a second axis relative to the affixed base, and the first axis is perpendicular to the second axis, and the first axis and the second axis are both perpendicular to the optical axis.

8. The optical system as claimed in claim 7, wherein the second driving module is adapted to drive the image sensor and to move the image sensor along the first axis and the second axis relative to the first moveable unit.

9. The optical system as claimed in claim 2, further comprising a second moveable unit and a third driving module, wherein the optical module is connected to the second moveable unit, and the third driving module is adapted to move the second moveable unit and the optical module relative to the first moveable unit.

10. The optical system as claimed in claim 9, further comprising a third inertia sensor and a third magnetic element, wherein the third inertia sensor is disposed on the second moveable unit, the third magnetic element is disposed on the first moveable unit, the third inertia sensor corresponds to the third magnetic element, the control unit is coupled to the third inertia sensor, and the control unit controls the third driving module according to a third sensing signal generated by the third inertia sensor.

11. The optical system as claimed in claim 9, wherein the first driving module comprises a first coil, the second driving module comprises a second coil, the first moveable unit comprises a magnetic unit, the magnetic unit further comprises a first magnetic element and a second magnetic element, a magnetic pole alignment direction of the first magnetic element is not parallel to a magnetic pole alignment direction of the second magnetic element, the first coil corresponds to the second magnetic element, and the second coil corresponds to the first magnetic element and the second magnetic element simultaneously.

12. The optical system as claimed in claim 11, wherein the third driving module comprises a third coil, the third coil is disposed on the second moveable unit, and the third coil corresponds to the first magnetic element.

13. The optical system as claimed in claim 12, wherein the magnetic unit is located between the first coil and the third coil.

14. The optical system as claimed in claim 12, wherein the magnetic unit is adapted to be driven by the first coil, the second coil and the third coil.

15. The optical system as claimed in claim 12, wherein the first magnetic element comprises a first pole and a second pole, the second magnetic element comprises a third pole and a fourth pole, the second pole is adjacent to the second magnetic element, the first pole is opposite to the second pole, the fourth pole faces the second coil, the third pole is opposite to the fourth pole, and a magnetic polarity of the first pole differs from a magnetic polarity of the fourth pole.

16. The optical system as claimed in claim 15, wherein in the magnetic pole alignment direction of the first magnetic element, a width of the first magnetic element differs from a width of the second magnetic element.

17. The optical system as claimed in claim 15, wherein in the magnetic pole alignment direction of the first magnetic element, the width of the first magnetic element is smaller than the width of the second magnetic element.

18. An optical system, comprising:

a first moveable unit;

an optical module, comprising an optical axis, wherein the optical module is connected to the first moveable unit;

an affixed base, wherein the first moveable unit is adapted to be moved relative to the affixed base;

a first driving module, adapted to drive the first moveable unit to move relative to the affixed base;

a first inertia sensor, wherein the first inertia sensor detects the movement of the optical module;

an image sensor, corresponding to the optical module;

a second driving module, adapted to move the image sensor relative to the first moveable unit;

a second inertia sensor, wherein the second inertia sensor is adapted to detect the movement of the image sensor relative to the first moveable unit;

a control unit, coupled to the first inertia sensor and the second inertia sensor, wherein the control unit controls the first driving module according to the first sensing signal generated by the first inertia sensor, and the control unit controls the second driving module according to the second sensing signal generated by the second inertia sensor; and a circuit module, adapted to be connected to an outer circuit, wherein the circuit module comprises:

a first circuit element, wherein the first inertia sensor is disposed on the first circuit element;

a second circuit element, wherein the second driving module and the second inertia sensor are disposed on the second circuit element; and a third circuit element, wherein the image sensor is disposed on the third circuit element, wherein the first circuit element, the second circuit element and the third circuit element overlap along the optical axis.

19. The optical system as claimed in claim 18, further comprising a circuit module, adapted to be connected to an outer circuit, wherein the circuit module comprises:

a second circuit element, wherein the second driving module and the second inertia sensor are disposed on the second circuit element, and the first inertia sensor is electrically connected to the second circuit element; and a third circuit element, wherein the image sensor is disposed on the third circuit element, wherein the second circuit element and the third circuit element overlap along the optical axis.

\* \* \* \* \*